Aug. 2, 1966    M. D. DANYI ET AL    3,263,892
SHIPPING CONTAINERS WITH ASSOCIATED INDICATOR MEANS
Filed June 11, 1964
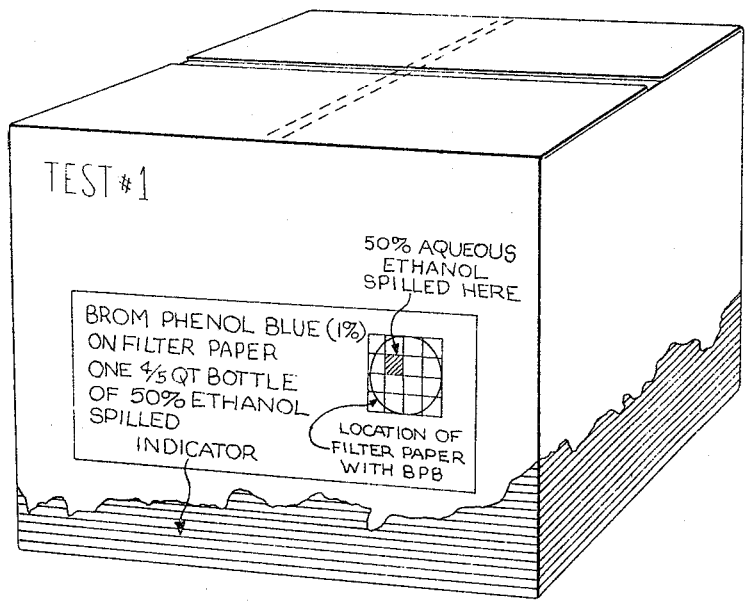
TRACED FROM ACTUAL COLOR PHOTOGRAPH
OF A STAINED SHIPPING CARTON
INVENTORS
MICHAEL D. DANYI
KAREL F. SPOREK
BY
ATTORNEYS

United States Patent Office 3,263,892
Patented August 2, 1966

3,263,892
SHIPPING CONTAINERS WITH ASSOCIATED INDICATOR MEANS
Michael D. Danyi, Oregon, and Karel Frantisek Sporek, Toledo, Ohio, assignors to Owens-Illinois Glass Company, a corporation of Illinois
Filed June 11, 1964, Ser. No. 374,463
12 Claims. (Cl. 229—6)

This invention relates to detectors for aqueous alcohol solutions, and to a method of use.

THE PROBLEM

Each year, hundreds of thousands of dollars worth of claims are not collected for in transit breakage of glass containers carrying aqueous alcoholic solutions. The problem of claims against the shipper is compounded by the fact that when breakage occurs, the lost solution will evaporate and dry before the shipment reaches the consignee. There is no visible marking produced on the exterior of the carton. Thus, there is no visible proof that there has been breakage, particularly if, say, only one out of about 24 pint bottles contained in a carton has been broken.

Accordingly, a substantial advance to the art would be provided by a shipping carton that would change color on exposure to aqueous alcoholic solutions and therefore would be easy to observe, to allow the consignee to make appropriate claims for damages before the carton containing the damaged goods was opened.

It is accordingly an important object of the present invention to provide an improved shipping carton including a tell-tale colorant that is selectively activatable by aqueous alcoholic solution contact.

A further object is to provide an improved shipping system for aqueous alcohol solutions that produces a visible color signal, indicating goods damaged or broken in shipment.

A further object is to provide a method for treating shipping cartons to render them selectively sensitive to aqueous alcoholic solutions, as distinguished from water, for exposing in transit damage to the contents.

A still further object is to provide a shipping carton that will change color distinctively when a contained bottle of aqueous alcohol is broken therein.

A still further object is to provide a breakage indicating detector for use with shipping cartons made of liquid permeable sheet materials, such as cardboard.

Other objects of the invention will appear in the following description and appended claims, reference being had to the accompanying drawing, forming a part of the specification.

The single figure of the drawing represents a shipping carton that has been treated in accordance with the invention and colored as the result of the breakage of a bottle of aqueous alcohol therein.

A PERSPECTIVE VIEW OF THE INVENTION

Broadly, the present invention relates to a colorant of selective sensitivity to aqueous alcohol solutions, as distinguished from water alone. In accordance with the invention, a very distinctive visible color is produced on the exterior of a shipping carton when aqueous alcohol comes in contact with the unique indicators of invention. However, no color signal is produced by the mere contact of water alone with the indicator. Thus, the present invention provides a positive indicator for broken goods, that will not give a false signal when a carton containing the improvement of the present invention is inadvertently exposed to weather conditions, such as wetting by rain water.

In accordance with invention, colorants or indicators of selective sensitivity are applied in an appropriate manner to or within a shipping carton so as to be contacted by aqueous alcohol, when a container for such a solution is accidentally broken inside the carton.

The present invention is adapted to use in shipping cartons for aqueous alcoholic materials such as medicines, beverages and the like.

In accordance with the principles of the invention, an indicator of selective sensitivity is so placed within a shipping carton that when a contained bottle of aqueous alcoholic material is broken as by undue impact in shipment, the spilled aqueous alcoholic solution will come in contact with the indicator. Since the indicator is soluble in the aqueous alcohol solution, it will be picked up and dissolved and carried through the walls of the carton to be deposited as a visible color on the outside.

THE INVENTION

In the following description, the family of chemical compounds specific to this invention; and the various ramifications of application will be explored in detail.

THE FAMILY OF COLORANTS OF SELECTED SENSITIVITY TO AQUEOUS ALCOHOLIC SOLUTIONS

The members of the family of compounds contemplated within the scope of the invention are all characterized by the same chemical nucleus, namely a triphenyl methyl group. Structurally, this nucleus is as follows:

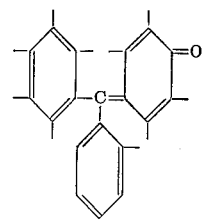

More specifically, the class of compounds encompassed within the scope of invention, is defined by the following general structural formula:

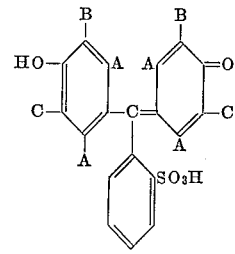

wherein
A is selected from H and $CH_3$;
B is selected from Br (halogen) and $CH_3$; and
C is selected from Br (halogen) and $CH(CH_3)_2$.

In accordance with the present invention, the following specific compounds have been proven operable in simulated use runs, thereby substantiating the basic principle of the invention: bromphenol blue, bromcresol green, bromcresol purple, and bromthymol blue.

As proof of the present invention, a series of runs simulating field usage was carried out. The following examples are all based upon the actual runs.

Example 1

Bromphenol blue, a phenolsulfonphthalein derivative, has been found to produce an outstanding color indication in accordance with the present invention. This compound is described as 3,3′,5,5′-tetrabromophenolsulfonphthalein. The empirical formula for this compound is $C_{19}H_{10}Br_4O_5S$. The compound has a molecular weight of 670.02. Analyses indicate carbon 34.06%, hydrogen 1.51%, bromine 47.71%, sulphur 4.79%, and oxygen 11.94%. The derivative is prepared by the slow addition of excess bromine to a hot solution of phenolsulfonphthalein in glacial acetic acid. The following structural formula is published in the literature for this compound:

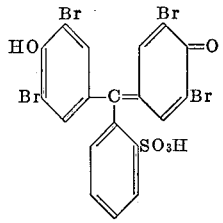

In utilizing bromphenol blue in accordance with the present invention, the following procedure was employed. This was run #1 of the series. Sheets of Eaton and Dikeman filter paper No. 615, 30 cm. diameter, were dipped in a 1% solution of bromphenol blue in 50% aqueous ethyl alcohol and were dried. An impregnated sheet of filter paper was then placed in the bottom of a shipping carton containing 12 4/5 quart glass bottles. 800 ml. of 50% aqueous ethyl alcohol was then spilled inside the carton to simulate the breakage of one of the bottles within the carton.

The carton was then left standing until the spilled liquid dried out. The indicator from the impregnated filter paper was taken into solution by the aqueous alcohol, that penetrated the sides and bottom of the cardboard shipping carton, and produced a vivid bluish-purple color on the outside. The colored area was about 3 inches wide, extending upwardly from the bottom along the sidewalls. The effect of the indication is shown in the drawing.

The drawing was produced by tracing from an actual color photograph of a stained shipping carton. To one side of the shipping carton there was attached a sheet of paper indicating the data of the test. Thus, the bromphenol blue impregnated filter paper was placed on the bottom of the carton, as indicated by the legend "location of filter paper with BPB." The 4/5 quart of 50% aqueous ethyl alcohol was released at the point marked "50% aqueous ethanol spilled here." When the color solution soaked through the sides of the carton, it gave an indication represented by the shaded area "indicator."

CONTROL TESTS

It will be evident to one skilled in the art that an operable indicator must have selective sensitivity to aqueous alcohol as against water alone. Thus, the indicator must show breakage within the carton, but must not give a false indication as when the carton is accidentally wetted by rain water, which condition might well be encountered on a shipping dock while the carton is in transit between the manufacturer and the consignee.

In accordance with the invention, the selectively sensitive indicators have been proven to be resistant against effect by water. Therefore, the following example is submitted as proof of this fact, and as substantiating the selective sensitivity of the unique family of compounds comprising the present invention.

Example II

A control run, #7 of the series, was prepared in accordance with the procedure of Example I. Thus, a sheet of Eaton and Dikeman filter paper, 30 cm. diameter, was impregnated with a 1% solution of bromphenol blue in 50% aqueous ethanol. The paper was then dried. Thereafter, the impregnated paper was placed in the bottom of a shipping carton containing twelve 4/5 quart bottles.

As the run was intended to simulate field use, a check was made to see if the colorant would penetrate through the walls of the carton when exposed to water per se. Therefore, the carton was placed in one-half inch of water and allowed to stand over night, 5:00 p.m. to 8:00 a.m.

The bottom part of the carton became wet to about 3 inches above the base, outside and inside, but the colorant did not penetrate the walls or bottom.

From the foregoing, it can therefore be concluded that the tests of Examples I and II clearly show that the breakage of bottles containing aqueous ethanol, produces a deep and easily discernible color on the outside walls of a shipping carton. Further, the tests show that the action of ambient moisture including soaking, would not interfere with a reliable indication.

Example III

It should be noted relative to Example II that the spillage of water instead of 50% aqueous ethanol directly within the carton and over the treated paper caused no leaching out of the colorant from the paper and therefore no coloration of the carton to give a false reading. This run, #6 of the series, was otherwise identical to run #7, constituting Example II.

Example IV

This is run #2 of the series from which the present examples were derived.

This is a further run using bromphenol blue. In this run, a 30 cm. Eaton and Dikeman filter paper No. 615 was impregnated with a 1% solution of bromphenol blue in 50% aqueous ethanol. The impregnated paper was then dried. The so-treated filter paper was then placed in the bottom of a shipping carton containing forty-eight ½ pint bottles. One ½ pint bottle of 50% aqueous ethanol was then spilled within the carton in a manner to contact the impregnated paper.

A distinct purple color was formed along the bottom of the sidewalls of the carton when the spilled solution dried. This gave a positive indication simulating breakage of a one-half pint bottle of aqueous ethanol within a carton containing forty-eight ½ pint bottles.

Example V

This is run #3 of the series. This was a further run using bromphenol blue. Dry crystals of the bromphenol blue were sprinkled over the bottom of a carton made for shipping twelve 4/5 quart bottles. In this run, 0.166 gram of the crystals was employed. This quantity of dry crystals is equivalent to the amount of material contained in one 30 cm. diameter sheet of filter paper prepared in accordance with Example I, i.e., by saturating with a 1% solution of bromphenol blue in 50% aqueous alcohol.

One 4/5 quart bottle of 50% aqueous ethanol was then spilled into the carton. A vivid purple color was produced to a substantially uniform height, extending approximately 3 inches up from the bottom, along the sidewalls.

A color photograph of the color produced by this test, when placed side-by-side with a similar color photograph of the color produced by Example I indicates approximately the same to very slightly deeper coloration in the present run than in the run forming the basis of Example I.

Example VI

Run #4. In this run, a 1% solution of bromphenol blue was prepared using 50% aqueous ethanol as a solvent. The solution was painted as 1 inch wide stripes on the bottom of a carton used for shipping forty-eight ½ pint bottles. The stripes were spaced 1½ inches apart.

Thereafter, a ½ pint bottle of 50% aqueous ethanol was spilled over the bottom of the carton. A distinctive purple color was produced on the exterior, extending to a maximum height of about 2 inches above the bottom. The color was clearly and easily visible.

*Example VII*

Bromcresol green, a derivative of m-cresolsulfonphthalein, has also been found to produce a highly satisfactory indicator in accordance with the present invention. This compound is described as 3,3′,5,5′-tetrabromo-m-cresolsulfonphthalein. The empirical formula for this chemical compound is $C_{21}H_{14}Br_4O_5S$. The compound has a molecular weight of 698.05. Quantitative analyses indicate carbon 36.13%, hydrogen 2.02%, bromine 45.79%, sulphur 4.59% and oxygen 11.46%. This derivative is prepared by adding bromine to a suspension of m-cresolsulfonphthalein in glacial acetic acid. Structurally the following formula is published in the literature for this compound:

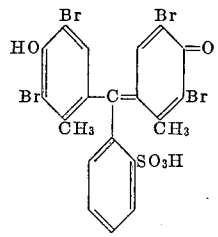

This is run #5 of the series. In this run, a 1% solution of bromphenol green in 50% aqueous ethanol was used to impregnate a 30 cm. diameter Eaton and Dikeman filter paper No. 615. The paper was dried and then placed on the bottom of a cardboard shipping carton for twelve ⅘ quart bottles.

One ⅘ quart bottle of 50% aqueous ethanol was spilled into the carton representing the breakage of a single bottle.

When the color solution formed by contact between the treated filter paper and the aqueous ethanol soaked through the sidewalls of the carton, it produced a distinct blue color about 3 inches in width extending around the bottom edges of the sidewalls. Essentially the same result as shown in the drawing was produced.

An actual color photograph was made to record the results of this and the other runs of the series.

*Example VIII*

Bromcresol purple, a cresolsulfonphthalein derivative, has also been found to produce satisfactory results in accordance with the present invention and is a good indicator. This compound is described in the literature as 5,5′-dibromo-o-cresolsulfonphthalein. The empirical formula is $C_{21}H_{16}Br_2O_5S$. The compound has a molecular weight of 520.24. Quantitative analyses indicate carbon 46.68%, hydrogen 2.99%, bromine 29.59%, oxygen 14.81%, and sulphur 5.94%. The compound is prepared by treating o-cresol red with bromine in glacial acetic acid. Structurally, the following formula is published in the literature for this compound:

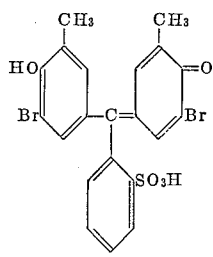

Run #8 of the series. In this run, a 1% solution of bromcresol purple in 50% aqueous ethanol was used to impregnate a 30 cm. diameter Eaton and Dikeman filter paper No. 615. The impregnated and dried filter paper was placed on the bottom of a cardboard shipping carton for twelve ⅘ quart bottles.

One ⅘ quart bottle of 50% aqueous ethanol was spilled into the carton. When the colorant solution, produced by the spillage, soaked through the sides of the carton, it produced a distinct orange yellowish color, about 3 inches in width, around the bottom edges of the sidewalls. Essentially the result represented in the drawing was produced. However, because the color produced was yellowish orange instead of vivid purple, the indication was not quite as vivid as that produced by bromphenol blue. However, the color was readily observable and provided an entirely satisfactory indicator system.

An actual color photograph was made to record the results of the run.

*Example IX*

Bromthymol blue, a thymolsulfonphthalein derivative, has also been found to produce a highly satisfactory indicator in accordance with the present invention. This compound is described as 3,3′ - dibromothymolsulfonphthalein. The empirical formula for the compound is $C_{27}H_{23}Br_2O_5S$. The compound has a molecular weight of 624.39. Quantitative analyses indicate carbon 51.93%, hydrogen 4.52%, bromine 25.60%, sulphur 5.14%, and oxygen 12.81%. The derivative is prepared by the action of bromine on thymol blue in glacial acetic acid. Structurally, the following formula is published in the literature for this compound:

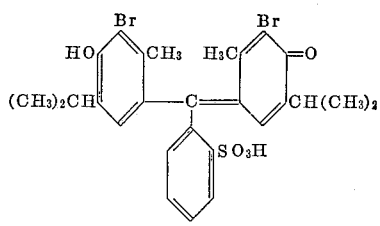

Run #9 of the series. In this run, a 1% solution of bromthymol blue in 50% aqueous ethanol was used to impregnate a 30 cm. diameter Eaton and Dikeman filter paper No. 615. The impregnated and dried filter paper was placed on the bottom of a cardboard shipping carton for twelve ⅘ quart bottles.

One ⅘ quart (800 ml.) bottle of 50% aqueous ethanol was spilled into the carton and over the filter paper. The colorant solution so produced, soaked through the sides of the carton and formed a quite vivid orange color about 3 inches in width around the bottom edges of the sidewalls. Essentially, the result represented in the drawing was produced, but because the color was yellowish orange as in Example VIII, instead of vivid purple per Example I, the indication was not quite as distinct. Nevertheless, the color was readily discernible and produced an entirely satisfactory indication of the hypothetical breakage within the carton.

An actual color photograph was made to record the results of the run.

*Example X*

In order to substantiate the proposition of the present invention "placing the indicator in a position to be contacted by aqueous alcoholic solution spilled within the carton," the following run was made.

Bromphenol blue was sprayed lightly onto one side only of a 30 cm. diameter Eaton and Dikeman filter paper No. 615, using a 1% solution of the chemical in 50% aqueous alcohol. The filter paper was dried and then placed on the bottom of a carton for twelve ⅘ quart glass containers. One ⅘ quart of 50% aqueous ethanol was then spilled into the carton.

A light to medium intensity purple color was produced along the outside of the carton, extending upwardly from the bottom for a distance of about 3 inches.

The color area was substantially as represented in the drawing, but the intensity was about one-half the value recorded in the run of Example I, due to the lesser amount of chemical used.

This experiment proves that very small amounts of indicator will produce operable results in accordance with the invention. As long as a reasonable concentration of material is placed within the carton in a manner to be contacted by aqueous alcohol solution settling to the bottom of the carton through the force of gravity, the invention will be operable.

A color photograph was taken to record the run.

THE UNIQUE ASPECT OF THE INDICATORS OF THE PRESENT INVENTION

To show the unique sensitivity of the indicators of the present invention, a number of other chemicals were also checked in a similar manner but were found unsatisfactory. These are as follows:

Aniline Blue
Aniline Yellow
Eosin Bluish
Nigrosin B
Methylene Blue Chloride
Methylene Blue, and
Rhodamine B Base The present invention is applicable to use with container wall structures that are pervious to aqueous alcohol so that the colorant can be carried through by capillary action and deposited on the outside. Such a carton may be characterized as being wettable. The common materials are of fibrous board structure, such as cardboard.

Impregnated filter papers have been disclosed. However, it is to be understood that the selectively sensitive colorant can be applied as by coating onto, or impregnating into, the wall of a carton in a condition to be contacted by aqueous alcohol spilled within the carton.

This invention is relatively more sensitive to use with ethanol. However, there is some sensitivity to methanol; and fair sensitivity to isopropanol.

We claim:

1. A shipping carton having a fiberboard wall and having a colorant positioned adjacent to the interior of said wall in exposed relation and in dry form and said colorant being selectively soluble in aqueous alcohol and of relatively low solubility in water.

2. In a shipping carton for shipping frangible containers of aqueous alcohol,
a liquid-permeable wall structure,
a colorant impregnated into said wall structure so as to be contacted by aqueous alcohol released within said carton,
and said colorant being selectively soluble in aqueous alcohol released within said carton.

3. In a packaged product,
an enclosing carton,
a frangible container of product containing aqueous alcohol positioned within said carton,
and said enclosing carton including an indicator in exposed, dry condition, and preferentially soluble in the aqueous alcohol product as compared to ambient moisture in order to produce a color signal on the outside of the carton indicating spillage of the alcohol product produced by breakage within the carton.

4. In a system for shipping frangible containers of aqueous alcohol,
a carton having a fluid-pervious wall,
a container of aqueous alcohol within said carton,
and a colorant within the carton, in an exposed, dry condition to be contacted by aqueous alcohol released within the carton, and said colorant being selectively soluble in aqueous alcohol as distinguished from water.

5. A shipping carton comprising fibrous board material having an inner surface and with a colorant impregnated onto said inner surface in dry, exposed condition that is selectively soluble in aqueous alcohol, but not appreciably soluble in water.

6. The invention of claim 5 wherein the colorant is selectively soluble in aqueous alcohol containing at least 40% ethanol by volume.

7. The invention of claim 5 wherein the colorant is selectively soluble in aqueous alcohol containing from about 40% to about 80% ethanol by volume.

8. In a system for shipping frangible containers of aqueous alcohol,
a carton,
a frangible container of aqueous alcohol product within said carton,
and a colorant within the carton in exposed, dry condition, positioned to be contacted by aqueous alcohol released within the carton by breakage of said frangible container, and said colorant being a compound of the formula

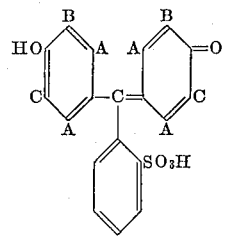

wherein
A is selected from H and $CH_3$;
B is selected from Br and $CH_3$; and
C is selected from Br and $CH_3(CH_3)_2$.

9. In a carton for shipping frangible containers of aqueous alcohol products,
a carton having a wall,
a colorant applied to the carton wall in exposed, dry condition, and in a manner to be contacted by aqueous alcohol released within the carton,
and said colorant being a compound of the formula

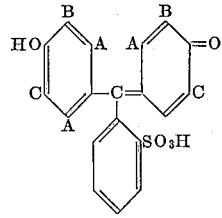

wherein
A is selected from H and $CH_3$;
B is selected from Br and $CH_3$; and
C is selected from Br and $CH_3(CH_3)_2$.

10. In a shipping carton for frangible containers containing aqueous alcohol products,
the carton having a liquid-permeable fiberboard wall,
a colorant positioned on said wall in dry form and in exposed relationship to be contacted by aqueous alcohol on breakage of a frangible container containing the same within said wall,
and said colorant being selectively soluble in aqueous alcohol and of relatively low solubility in water.

11. A shipping carton comprising a wall of fibrous, fluid-permeable material having an interior surface,
an absorbent carrier positioned adjacent to said interior surface, and a colorant deposited into said absorbent carrier in dry form, said colorant being selectively soluble in aqueous alcohol, but substantially insoluble in water.

12. A shipping carton comprising a wall of fluid-permeable material and having an interior,
an absorbent carrier within said interior,
and a colorant deposited on said absorbent carrier in dry form, said colorant being selectively soluble in aqueous alcohol but substantially insoluble in water.

References Cited by the Examiner

UNITED STATES PATENTS

| | | | |
|---|---|---|---|
| 1,245,386 | 11/1917 | Sackett | 229—3.1 |
| 1,773,064 | 8/1930 | Schoettle | 229—3.1 X |
| 1,843,234 | 2/1932 | Karnes et al. | |
| 2,093,985 | 9/1937 | Stansbury. | |
| 2,250,980 | 7/1941 | Workman et al. | |
| 2,708,645 | 5/1955 | Norman | 229—3.1 X |
| 3,093,242 | 6/1963 | Huyck et al. | |

GEORGE O. RALSTON, *Primary Examiner.*